United States Patent Office 2,761,808
Patented Sept. 4, 1956

2,761,808

PLASMA FRACTIONATION PROCESS

Heron O. Singher and Richard S. Lowy, Plainfield, N. J., assignors to Ortho Pharmaceutical Corporation, a corporation of New Jersey No Drawing. Application September 6, 1952,
Serial No. 308,298

3 Claims. (Cl. 167—84.5)

This invention relates to a process for the fractionation of human plasma and relates particularly to such a process in which a plasma fraction capable of enhancing the avidity of blood-grouping sera is obtained.

In 1939, Levine and Stetson, J. A. M. A., 113:126, 1939, reported a transfusion reaction in a woman who delivered a macerated fetus and whose serum contained agglutinins. In 1940, Landsteiner and Wiener, Proc. Exper. Biol. and Med. 43:223, 1940, reported the preparation of an antiserum against the red cells of the Rhesus monkey and found that this anti-Rhesus serum, when properly absorbed, agglutinated the blood of approximately 85% of the members of the white race that were tested. They labelled the antigen in the human bloods that reacted with the anti-Rhesus serum the Rh factor. Human bloods containing the Rh factor were termed Rh-positive. It was shown that Levine and Stetson, who reported the earlier transfusion reaction, were dealing with a case of Rh immunization and that the unnamed property was the property later named the Rh factor by Landsteiner and Wiener. Levine, Katzin, and Burnham, J. A. M. A., 116: 825, 1941, reported that intra-group incompatibility could be produced by immunization of an Rh-negative mother by an Rh-positive fetus. These investigators demonstrated at the same time that Rh immunization explained the majority of cases of erythroblastosis fetalis.

Soon after the initial discovery and study of Rh factors, it was apparent that their importance required that the usual blood typing tests be expanded to include typing tests relating to the new factors. A rapid microscopic slide agglutination test was developed by which human bloods could be qualitatively classified with respect to the Rh factors. It was found subsequently that blood-grouping sera exhibited marked variations between test-tube titer, which measures the quantity of isohemagglutinin, and avidity, a term adopted to designate the time required for miscroscopic slide agglutination. The possibility of enhancing the avidity of blood-grouping sera has been studied by several investigators. Some enhancement of titer has been accomplished by concentrating the grouping globulins through neutral salt precipitation by methanol or ethanol fractionation. Although some initial enhancement of avidity has been shown to occur in preliminary stages of purification of plasma, avidity decreases when purification is carried further. Louis Pillemer, Annals of the New York Academy of Science, vol. 46, pages 915–925, 1946, has summarized the relationship between avidities and titers of normal sera, of grouping globulins prepared by methanol and ethanol fractionation. and of isoimmune sera and reported that grouping globulins, especially those prepared with methanol, showed strikingly the greatest avidities. The conclusion was reached that, during methanol fractionation, a constituent of serum not necessarily associated with titer was concentrated. This serum constituent is associated with avidity and is apparently removed or destroyed in the course of extensive purification. Although it is suggested that lipoidal substances or complexes may play a role in the avidity of isohemagglutinin globulins, it is apparent that the avidity-enhancing material in typing sera is not well understood.

It is an object of this invention to provide a process for the preparation of a human plasma fraction capable of enhancing the avidity of Rh typing sera.

It is another and more particular object of this invention to provide a simple and efficient process for the preparation of a human plasma fraction effective in enhancing the avidity of Rh typing sera.

It has now been discovered that the objects of this invention may be accomplished and a human plasma fraction, which is valuable for use in enhancing the avidity of Rh typing sera of low avidity, may be prepared by a process in which human plasma is subjected to a three-step fractionation; with removal in the first step of albumin and alpha globulins, removal in the second step of beta globulins, and removal in the third step of gamma globulins. The residual human plasma fraction contains in high concentration a plasma component having the property of enhancing the avidity of Rh typing sera.

The avidity enhancing fraction is universally present in human plasma. In the initial fractionation step of the process of this invention, at least four volumes, based on the volume of plasma, of a first aqueous alcohol solution, adjusted to a pH of 4 to 5, and containing 20% to 30% by weight of a low molecular weight water-soluble aliphatic alcohol, such as methanol, ethanol, propanol, or isopropanol; and 40 to 90 millimols of a low molecular weight water and alcohol soluble organic acid having the ability to act as a buffer in a pH range of 4 to 5, such as acetic, citric, propionic or succinnic acids; is added to human plasma. The solution is adjusted to a pH between 4 and 5 with an alkali, stirred and kept at 0° to 5° C. until a precipitate is formed. The precipitate, which contains the avidity-enhancing principle, is removed while the mixture is at 0° C. to 5° C. and the supernatant liquid, containing mainly albumin and some alpha globulins, is discarded.

In general, any solution of a low molecular weight water and alcohol soluble organic acid buffer and a low molecular weight water-soluble aliphatic alcohol which when added to human plasma in the proportion by volume of at least four parts solution to one part plasma provides a mixture which, upon dilution with water to less than one per cent by volume of the alcohol present in the mixture, has a pH in the range of 4 to 5; is a satisfactory first aqueous alcohol solution for use in the initial fractionation step.

The precipitate obtained from the first fractionation step is extracted with at least two volumes, based on the original volume of the plasma, of a second aqueous alcohol solution containing 5% to 8% by volume of a low molecular weight water-soluble aliphatic alcohol, such as methanol, ethanol, propanol, or isopropanol; 0.4 to 0.5 mols per liter of a low molecular weight water-soluble alpha amino acid such as glycine, alanine, alpha amino butyric acid, or proline; and 35 to 65 millimols of a low molecular weight water-soluble weak organic acid buffer adjusted to a pH of 4.8 to 5.5 with alkali, such as a buffer prepared by using acetic, citric, propionic, or succinnic acid. The second fractionation step may be carried out at room temperature and the mixture of the second aqueous alcohol solution and the precipitate obtained from the first fractionation step is stirred for a short period of time until the portion of the precipitate that is soluble in the second aqueous alcohol solution is dissolved. The mixture is centrifuged and the supernatant which contains mainly inactive beta globulins is discarded.

In general, any aqueous solution of a low molecular weight water-soluble aliphatic alcohol, a low molecular weight water-soluble amino acid, and a weak organic acid buffer which, upon addition to the precipitate obtained by centrifugation from the first fractionation step, in a proportion by volume of at least two parts solution to one part of the original plasma, provides a mixture having a pH in the range of 4.8 to 5.5 upon dilution to less than one per cent by volume of the alcohol present in the mixture; is a satisfactory second aqueous alcohol solution for use in the second fractionation step of the process.

The portion of the precipitate obtained by centrifugation after the second fractionation step contains the avidity-enhancing principle and is extracted with at least four volumes, based on the original volume of plasma, of a third aqueous alcohol solution containing 5% to 8% by volume of a low molecular weight water-soluble aliphatic alcohol and 0.4 to 0.5 mol per liter of a low molecular weight water-soluble amino acid. The solution of alcohol and amino acid is buffered with an acid buffer, such as a buffer prepared by using phosphoric acid at a pH of 6.6 to 7.0. The addition of the third aqueous solution to the material obtained from the second fractionation step may be made at room temperature. The mixture is stirred until all of the material soluble in the third solution has dissolved, and then centrifuged, and the residual undissolved precipitate is dialyzed and lyophilized. The undissolved material recovered by centrifugation contains the avidity-enhancing principle and the supernatant which contains mainly inactive gamma globulins is discarded.

In general, any aqueous solution of a low molecular weight water-soluble aliphatic alcohol, a low molecular weight water-soluble amino acid, and an acid buffer, which upon addition to the precipitate obtained by centrifugation from the second fractionation step in a proportion by volume of at least four parts solution to one part of the original plasma, provides a mixture having a pH in the range of 6.6 to 7.0 upon dilution to less than one per cent by volume of the alcohol present in the mixture; is a satisfactory third aqueous alcohol solution for use in the third fractionation step of the process.

For a fuller understanding of the invention, reference should be had to the following example which is given as a specific illustration. It should be understood, however, that the invention is not limited to the specific details set forth in the illustration.

*Example*

Four liters of an aqueous solution containing 25% of ethanol by volume and 68 millimols of acetic acid was adjusted to pH 4.5 with sodium hydroxide and slowly added with stirring to one liter of human plasma. The temperature of the mixture was maintained at —5° C. throughout the addition. After addition of the solution to the plasma was complete the mixture was stirred for one hour. A precipitate was formed and removed by centrifugation and during this time the temperature of the mixture was maintained between 0° and —5° C. The supernatant was discarded. The precipitate was extracted with five liters of an aqueous solution, adjusted to pH 5 with sodium hydroxide, containing 6.7% of ethanol by volume, 0.4 mol of glycine per liter of solution, and 60 millimols of acetic acid. The extraction was made at room temperature and the mixture was stirred for one hour and centrifuged. The supernatant was discarded. The precipitate obtained from the extraction was extracted with four liters of an aqueous solution containing 6.7 per cent by volume of ethanol and 0.4 mol per liter of glycine. This extracting solution was buffered with a phosphate buffer at pH 6.8. The temperature of the mixture was maintained at room temperature, stirred for one hour and centrifuged. The supernatant was discarded. The residual precipitate was dialyzed and lyophilized. Four hundred and eighty milligrams of material, containing the avidity-enhancing principle in a concentrated form, were obtained. Six milligrams of the material per cc. were added to an Rh serum having an avidity such that it required 13 seconds to agglutinate a test sample of human blood. This resulted in an increase of the avidity such that the agglutination time was reduced to six seconds. It is generally considered that a satisfactory agglutination time should be less than eight seconds.

What is claimed is:

1. A process for the fractionation of human blood plasma to obtain a fraction having the ability to enhance the avidity of Rh typing sera, comprising the steps of: adding to human blood plasma at least four volumes, based on the volume of plasma, of a first solution, adjusted to a pH of 4 to 5, and containing 20% to 30% by weight of a low molecular weight water-soluble aliphatic alcohol, 40 to 90 millimols of a low molecular weight water and alcohol soluble organic acid having at least two carbon atoms and having the ability to act as a buffer in the pH range of 4 to 5, stirring and maintaining the temperature of the mixture of the solution and plasma at a temperature of 0° C. to 5° C. until a precipitate is formed, removing the precipitate from the mixture at a temperature of 0° C. to 5° C.; extracting the precipitate with at least two volumes, based on the original volume of the plasma, of a second solution, adjusted to a pH of 4.8 to 5.5, and containing 5% to 8% by volume of a low molecular weight water-soluble aliphatic alcohol, 0.4 to 0.5 mol per liter of a low molecular weight water-soluble alpha amino acid, and 35 to 65 millimols of a low molecular weight water-soluble weak organic acid having at least two carbon atoms and having the ability to act as a buffer in a pH range of 4.8 to 5.5, stirring the mixture of the second solution and precipitate and separating the insoluble portion of the precipitate; extracting the insoluble portion of the precipitate with at least four volumes, based on the original volume of the plasma, of a third solution, adjusted to a pH of 6.6 to 7.0, and containing 5% to 8% by volume of a low molecular weight water-soluble aliphatic alcohol, 0.4 to 0.5 mol per liter of a low molecular weight water-soluble alpha amino acid, and an acid having the ability to act as a buffer in a pH range of 6.6 to 7.0, stirring the mixture and separating the insoluble portion.

2. A process according to claim 1 in which the alcohol in the three aqueous alcohol solutions is ethanol, the acid buffer is formed from acetic acid in the first and second and from phosphoric acid in the third aqueous alcohol solutions, and the amino acid in the second and third aqueous alcohol solutions is glycine.

3. A process according to claim 1 in which the alcohol in the three aqueous alcohol solutions is methanol, the acid buffer is formed from succinnic acid in the first and second and from phosphoric acid in the third aqueous solutions, and the amino acid in the second and third aqueous alcohol solutions is alanine.

References Cited in the file of this patent

UNITED STATES PATENTS

| | | |
|---|---|---|
| 2,385,803 | Cohn | Oct. 2, 1945 |
| 2,390,074 | Cohn | Dec. 4, 1945 |

OTHER REFERENCES

Greenberg: Amino Acids and Proteins, first edition (1951), pages 726 to 727.